J. E. WARREN.
FENCE-POSTS.
No. 183,032. Patented Oct. 10, 1876.
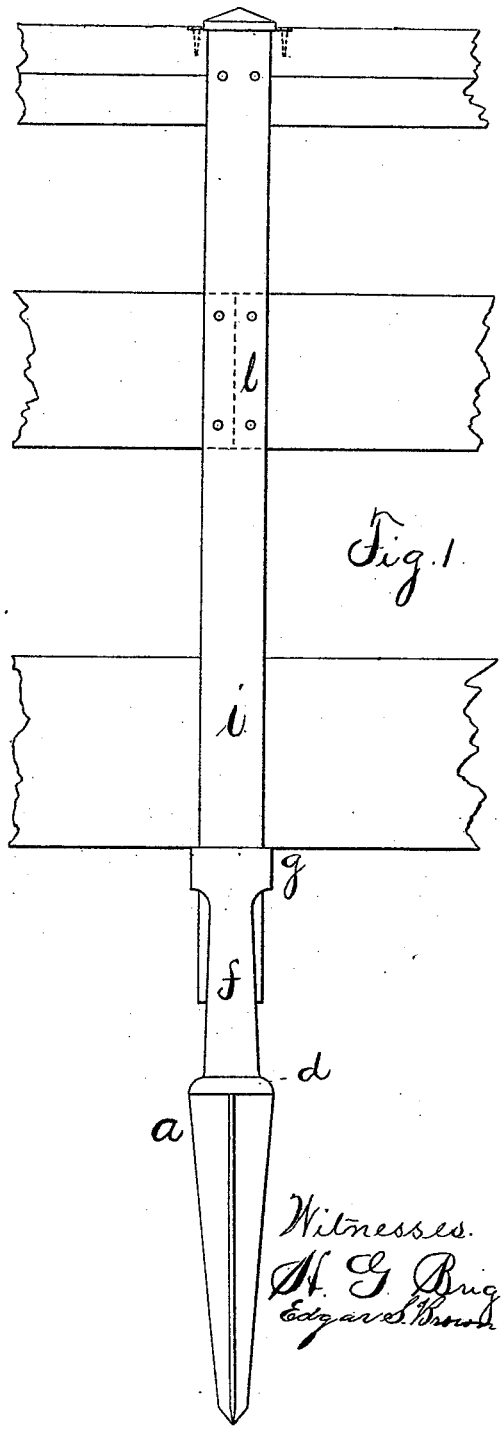
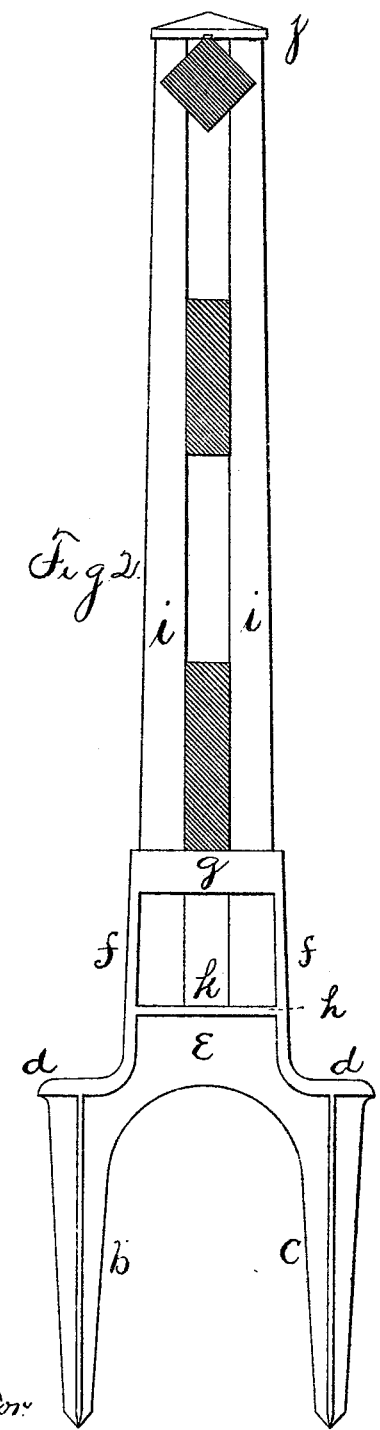

UNITED STATES PATENT OFFICE.

JOHN E. WARREN, OF WESTBROOK, MAINE.

IMPROVEMENT IN FENCE-POSTS.

Specification forming part of Letters Patent No. 183,032, dated October 10, 1876; application filed July 26, 1876.

*To all whom it may concern:*

Be it known that I, JOHN E. WARREN, of Westbrook, in the county of Cumberland and State of Maine, have invented certain new and useful Improvements in Fences; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a side elevation. Fig. 2 is an end view.

Same letters show like parts.

The object of my invention is to produce certain improvements in fence-posts, and a description of the parts will best show in what the invention consists.

$a$ shows the base, made of cast-iron. It has the two points or arms, $b\ c$. These arms are intended to enter the ground, the cap-pieces $d$ resting upon the top thereof, or perhaps slightly sunk into the ground. The arms $b\ c$ are composed of projecting edges, as illustrated in Fig. 2. This construction enables them to enter the ground easily and hold firmly therein. The two legs or arms $b\ c$ are connected by the plate $e$, which, entering the ground somewhat, also aids in giving to the cast-iron bottom or foot a firm position in the soil. Rising from the arms $b\ c$ are the two side pieces, $f$, united at their tops by the socket $g$, as shown in the drawing. The top edge of the plate $e$ is provided with a flat surface, $h$. $i\ i$ show the two parts forming the wooden post of the fence. These are placed in the socket $g$, their lower ends resting upon the plate $h$. Between the two parts forming the post is then driven the key $k$. The two parts $i\ i$ are made tapering or wedge-shaped in form, so that the insertion of the key has the effect to securely bind them in the socket.

Instead of the two parts composing the posts they may be made of a single piece of wood. $j$ is a cast-iron cap, fitted to the top of the posts to improve the appearance of the structure, and to prevent the action of weather at the joints of the rails at the top.

The structure can be readily placed in the ground, and constitutes a firm and secure fence.

The rails, in case of the use of the post in two parts, can be passed between the two parts of the posts, as illustrated in the drawing. It will be observed that the socket at the bottom ends of the posts is made somewhat larger at the bottom than at the top, forming a dovetail-socket. This, in connection with the shape of the posts and with the key before described, fastens the posts very securely in place.

When the posts are made in two parts, as shown in Fig. 2, they are to be made of sufficient width so that the joint formed by the abutting ends of two rails shall be covered and included by the posts, as illustrated at $e$, Fig. 1.

What I claim as my invention, and desire to secure by Letters Patent, is—

The combination, with the cast-iron foot or standard $a$, having the two arms $b\ c$, caps $d$, plate $e$, side pieces $f$, socket $g$, and flat surface $h$, of the wooden post, substantially as herein described.

In testimony that I claim the foregoing as my own I affix my signature in presence of two witnesses.

JOHN E. WARREN.

Witnesses:
 WILLIAM HENRY CLIFFORD,
 HERBERT G. BRIGGS.